United States Patent [19]

Buol et al.

[11] Patent Number: 4,948,086

[45] Date of Patent: Aug. 14, 1990

[54] SUPPORT APPARATUS

[75] Inventors: Richard Buol, 670 Gregory La., Ste. A102, Pleasant Hill, Calif. 94523; Jonathan M. Buol, Pleasant Hill, Calif.

[73] Assignee: Richard Buol, Pleasant Hill, Calif.

[21] Appl. No.: 436,074

[22] Filed: Nov. 13, 1989

[51] Int. Cl.⁵ .......................................... F16M 11/00
[52] U.S. Cl. ................................... 248/676; 248/176; 248/349
[58] Field of Search ............... 248/676, 678, 680, 176, 248/130, 349; 124/78; 273/26 D, 29 R, 29 A

[56] References Cited

U.S. PATENT DOCUMENTS

| 1,151,549 | 8/1915 | Schade . |
| 1,897,317 | 2/1933 | McEachern . |
| 3,604,371 | 9/1971 | Cavalucci . |
| 4,411,395 | 10/1983 | Steffens . |
| 4,442,823 | 4/1984 | Floyd et al. . |
| 4,466,595 | 8/1984 | O'Connor . |
| 4,542,872 | 9/1985 | Marino et al. ................... 248/349 X |
| 4,549,710 | 10/1985 | Prince et al. ..................... 248/349 X |
| 4,632,088 | 12/1986 | Bruce . |
| 4,635,894 | 1/1987 | Sammons ......................... 248/349 X |
| 4,697,778 | 10/1987 | Harashima ....................... 248/678 X |
| 4,705,256 | 11/1987 | Hofrichter ...................... 248/349 X |
| 4,712,534 | 12/1987 | Nozato . |
| 4,760,835 | 8/1988 | Paulson et al. . |

Primary Examiner—David M. Purol
Attorney, Agent, or Firm—Thomas R. Lampe

[57] ABSTRACT

Apparatus for supporting equipment such as a baseball pitching machine including a first support member defining a recess, a second support member positioned in the recess, a lubricator element disposed between the first and second support members, clamps for attaching the equipment to the second support member, and a threaded fastener extending through the first support member, second support member and lubricator element to the base of the equipment.

12 Claims, 2 Drawing Sheets

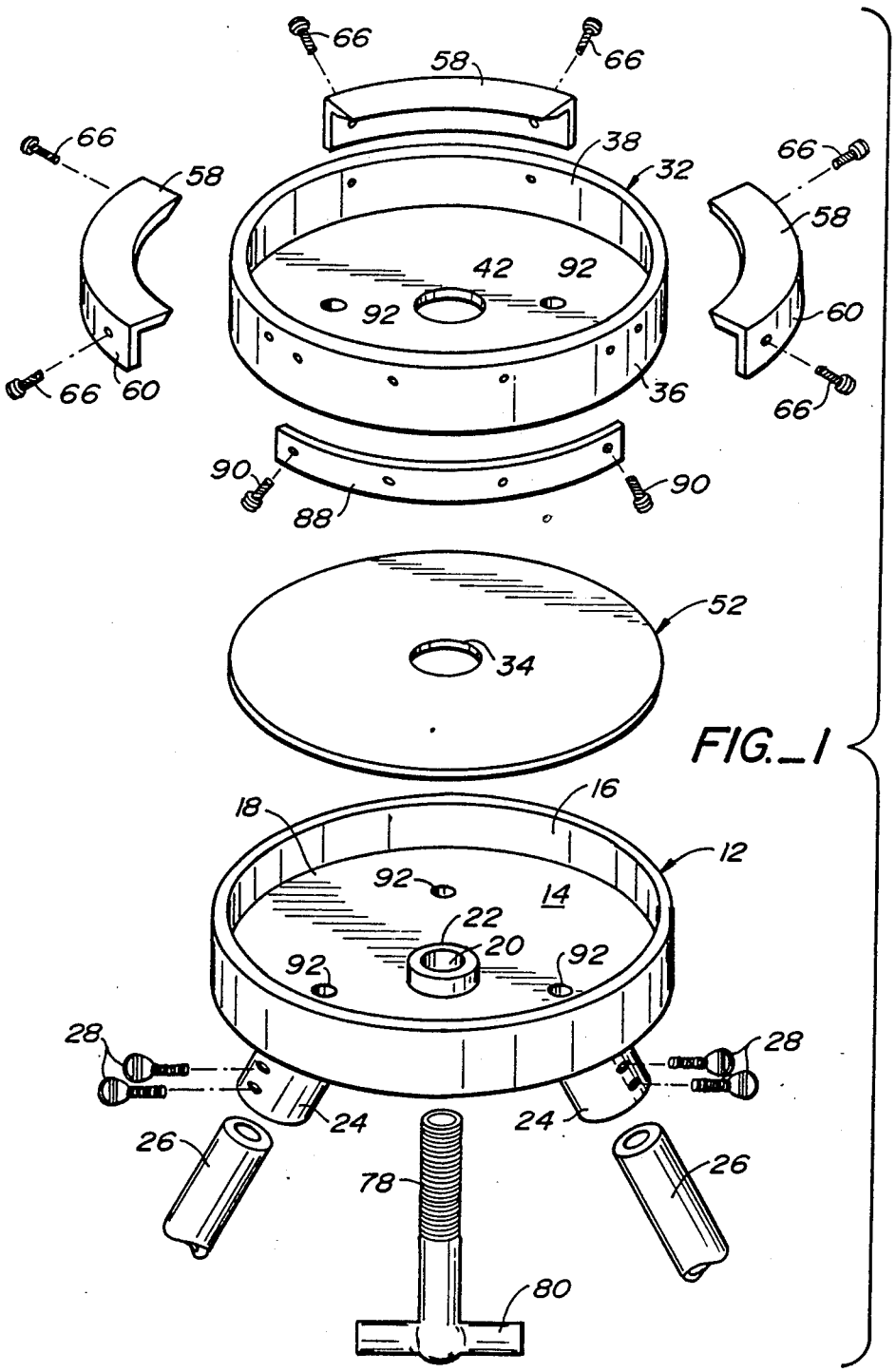
FIG._1

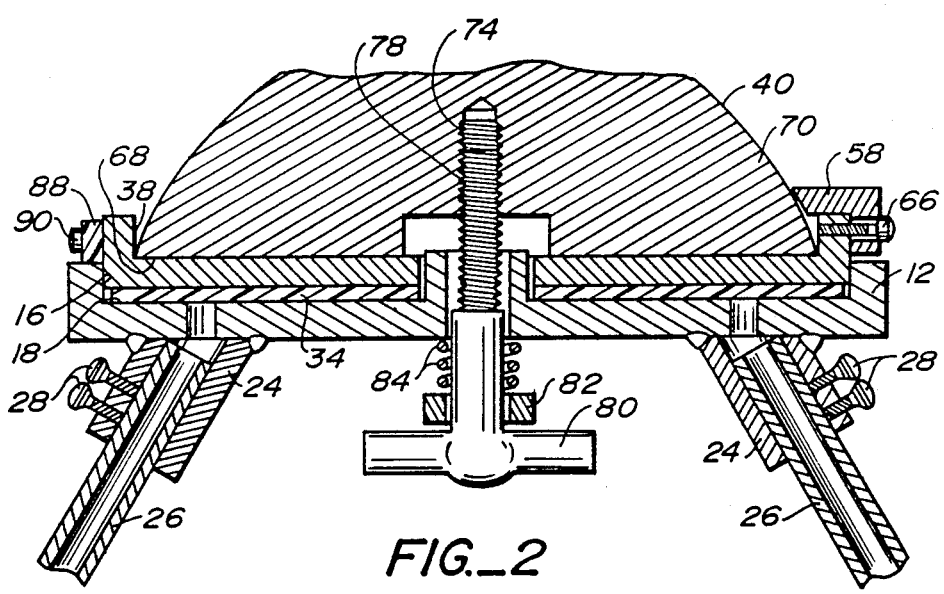
FIG._2
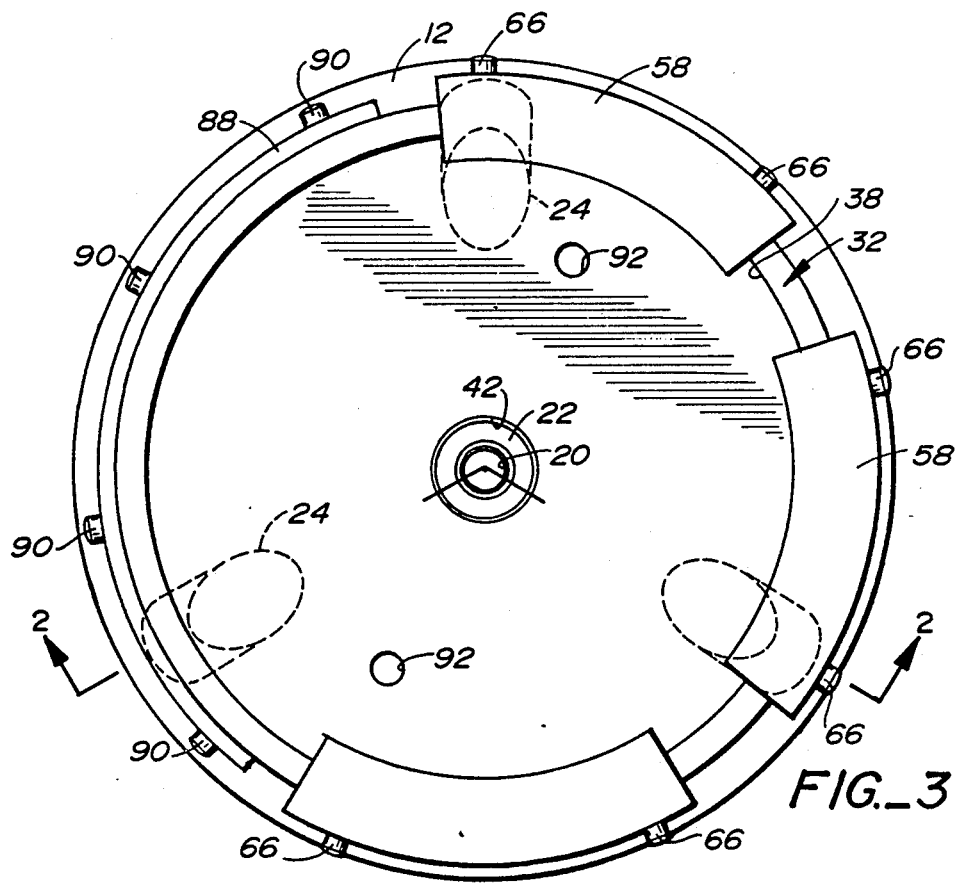
FIG._3

SUPPORT APPARATUS

TECHNICAL FIELD

This invention relates to apparatus for supporting equipment such as a baseball pitching machine. More particularly, the apparatus allows for the selective rotational movement of the equipment in a pre-determined plane.

BACKGROUND ART

Pitching machines are widely used to develop batting and fielding skills. An example of such equipment is the Casey baseball pitching machine sold by Athletic Training Equipment Company of Santa Cruz, Calif. Comparable equipment is made available by other manufacturers. Representative ball throwing machines are also shown in the following U.S. Pat. Nos.: 4,442,823, 4,712,534, 1,897,317, 4,760,835 and 4,632,088.

The use of pitching machines for fielding practice necessitates the use of a pitching machine support which allows the pitching machine to be selectively rotated so that the balls thrown by the machine can be delivered at various angles generally along the horizontal plane. Such supports have in fact been developed; however, they are generally characterized by their relative complexity and high expense.

Various platforms and stands are known in the prior art to support various types of equipment. For example, there are such devices disclosed in the following U.S. Pat. Nos.: 3,604,371, 4,466,595, 1,151,549 and 4,411,395. These prior art arrangements do not readily lend themselves to use with pitching machines which can be quite heavy and also impart dynamic forces which tend to destabilize their supports, causing same to either go out of adjustment or literally move on the ground or other support surface.

DISCLOSURE OF THE INVENTION

The apparatus of the present invention is characterized by its relative simplicity and low cost; however, the apparatus readily lends itself to use with baseball pitching machines and other relatively heavy, dynamic equipment to support same in a highly stable manner. Furthermore, the apparatus incorporates structure which enables the operator to readily selectively rotate the supported baseball pitching machine or other equipment.

The apparatus of the present invention includes a first support member having a planar upper surface and a circular-shaped inner peripheral wall extending upwardly from the planar upper surface and defining a first recess therewith. The first support member also defines a first aperture.

A second support member is positioned in the first recess, the second support member having a bottom surface and an outer peripheral wall closely adjacent to the inner peripheral wall. The second support member defines a second recess for receiving the base of the supported equipment. The second support member further defines a second aperture in at least partial registry with the first aperture of the first support member.

A flat lubricator element is disposed between the first and second support members. The flat lubricator element has opposed outer surfaces in engagement with the first support member upper surface and the second support member bottom surface to facilitate precise relative movement therebetween when desired.

Means is provided for attaching the equipment base to the second support member in the second recess. Threaded fastener means extends through the apertures and is in engagement with a threaded receptacle formed in the base of the baseball pitching machine or other equipment.

Other features, advantages, and objects of the present invention will become apparent with reference to the following detailed description and accompanying drawings.

BRIEF DESCRIPTION OF DRAWINGS

FIG. 1 an exploded perspective view illustrating the structural components of a preferred mode of apparatus constructed in accordance with the teachings of the present invention;

FIG. 2 is a cross sectional side view taken along the line 2—2 of FIG. 3 and, illustrating the apparatus in combination with the base of machine; and FIG. 3 is a plan view of the apparatus of the present invention.

BEST MODE FOR CARRYING OUT THE INVENTION

Referring to the drawing, the apparatus of the present invention includes a first support member 12 having a planar upper surface 14 and a circular-shaped inner peripheral wall 16 extending upwardly from the planar support surface and defining a first recess 18 therewith.

First support member 12 also defines a first aperture 20. The first support member includes a boss 22 projecting upwardly from planar upper surface 14. The first aperture 20 passes through the boss and the rest of first support member 12, as shown.

The first support member 12 includes spaced socket elements 24. The socket elements 24 receive the upper ends of support legs 26, the legs, of course, extending to the ground. Set screws 28 cooperable with threaded holes in the socket elements are utilized to releasably retain the upper ends of the support legs in the socket elements.

The apparatus of the present invention further includes a second support member 32 positioned in first recess 18. The second support member 32 has a bottom surface 34 (FIG. 2) and an outer peripheral wall 36 closely adjacent to inner peripheral wall 16

The second support member 32 defines a second recess 38. It will be appreciated that the second recess 38 receives the base 40 (FIG. 2) of the equipment, such as a pitching machine, held by the apparatus. For example, the pitching machine could be the Casey baseball pitching machine made available by Athletic Training Equipment Company of Santa Cruz, Calif.

Second support member 32 defines a second aperture 42 in general alignment with first aperture 20 of first support member 12. The boss 22 of the first support member 12 passes through second aperture 42 with a relatively close fit. Thus, the boss 20 and the inner peripheral wall 16 of the first support member 12 cooperate with the second support member 32 in such a way as to provide a highly stable relationship therebetween. In other words, outer peripheral wall 36 is in close proximity with inner peripheral wall 16 and the boss 22 is in close proximity to that portion of the second support member which defines second aperture 42.

The apparatus of the present invention also includes a flat lubricator element 52. Lubricator element 52 is disposed between the first and second support members with opposed outer surfaces thereof in engagement with the first support member upper surface 14 and the second support member bottom surface 34 to facilitate controlled relative rotational movement between the first and second support members, in a manner to be described in greater detail below.

Lubricator element 52 defines a third aperture 34 and the boss 22 extends through this third aperture as well as the second aperture 42 as previously described.

The lubricator element 52 has a disc-shaped configuration and is preferably formed of an acetal thermoplastic material. One such suitable material is Delrin, a homopolymer acetal manufactured by Dupont of Wilmington, Del.

Means is provided for attaching the equipment base 40 to the second support member while the base is in the second recess. More particularly, such means comprises clamp means in the form of a plurality of clamps 58 spaced from one another and secured to the second support member.

As may clearly be seen, clamps 58 are of identical construction. Each clamp 58 is of generally arcuate construction to conform with the shape of outer peripheral wall 36. Each clamp 58 has a vertical leg 60 and a horizontal clamp leg 62. Leg 62 extends over second recess 38 and is in engagement with base 40; that is, the equipment base is disposed between the clamps 58 and the second support member bottom surface 34. Screws 66 or any other type of suitable fastener may be used to secure the clamps in position on second support member 32.

As may be seen with reference to FIG. 2, equipment base 40 has a bottom 68 and an outer peripheral portion 70, the clamps 58 being in engagement with the outer peripheral portion and preferably having a shape at the point of engagement corresponding to the shape of the base outer peripheral portion.

A threaded receptacle 74 extends upwardly from the base bottom. A threaded fastener 78 extends upwardly through apertures 20, 42, and 54 into engagement with the threaded receptacle.

The threaded fastener includes a manually manipulable handle 80. A bushing 82 is disposed directly above the handle. Positioned about the threaded fastener and between bushing 82 and first support member 12 is a coil compression spring 84. It will be appreciated that the spring 84, when under compression, exerts compressive force against the first support member and a tensile force on the equipment base.

It will be appreciated that tightening of the threaded fastener to a certain predetermined degree will rigidly secure the second support member 32 against movement relative to first support member 12 regardless of the external forces exerted on the second support member. If the threaded fastener is loosened slightly, the operator will be able to turn the second support member and thus the equipment it supports relative to the first support member. However, the coil compression spring will continue to exert a downward pull on the second support member to a degree sufficient that rotational movement between the support members will be resisted to some degree so that the second support member and the equipment will stay in place relative to the first support member when external force is no longer applied by the user. Furthermore, the coil compression spring will serve to resist tilting or tipping of the second support member relative to the first support member. It will be appreciated that pitching machines and other types of equipment are occasionally unbalanced with respect to their bases so that a tipping can occur under the influence of gravity.

As an even greater deterrent to tilting, it is preferred that the apparatus include a stabilizer element. In particular, the stabilizer element is identified by reference number 88 and is in the form of a strip of acetal thermoplastic material shaped so that it has a generally arc-like configuration. The stabilizer element 88 is secured to the upper portion of the outer peripheral wall 36 of the second support member 32 at a location generally corresponding to the direction of tilt of a piece of unbalanced equipment. The stabilizer element 88, as best shown in FIG. 2, rides on the first support member, thus preventing any tilting relative thereto. The stabilizer element may be secured to the second support member by any desired expedient such as screws 90.

It should be noted that the first and second support members have vent holes 92 formed therein. Such vent holes are important when it is desired to disassemble the apparatus. Vent holes 92 will relieve any vacuum that might be created when withdrawing second support member 32 from first recess 18 or caused by removal of lubricator element 52 from the same recess.

What is claimed is:

1. Apparatus for supporting equipment such as a baseball pitching machine and for allowing selective rotational movement of said equipment in a pre-determined plane, said equipment including a base, said base having a bottom and an outer peripheral portion and defining a threaded receptacle extending upwardly from said bottom, said apparatus comprising, in combination;

a first support member having a planar upper surface and a circular-shaped inner peripheral wall extending upwardly from said planar upper surface and defining a first recess therewith, said first support member further defining a first aperture;

a second support member positioned in said first recess, said second support member having a bottom surface and an outer peripheral wall closely adjacent to said inner peripheral wall, said second support member defining a second recess for receiving said equipment base and a second aperture in at least partial registry with said first aperture;

a flat lubricator element disposed between said first and second support members having opposed outer surfaces in engagement with said first support member upper surface and said second support member bottom surface to facilitate relative movement therebetween;

means for attaching said equipment base to said second support member in said second recess; and threaded fastener means extending through said apertures and in engagement with said base threaded receptacle.

2. The apparatus according to claim 1 wherein said means for attaching said equipment base to said second support member in said second recess comprises clamp means.

3. The apparatus according to claim 2 wherein said clamp means comprises a plurality of clamps secured to second support member and extending over said second recess, said equipment base being disposed between said clamps and said second support member bottom surface.

4. The apparatus according to claim 1 wherein said first support member includes a boss projecting upwardly from said planar upper surface, said first aperture passing through said boss, said flat lubricator element defining a third aperture and said boss extending through both said second and third apertures.

5. The apparatus according to claim 1 wherein said lubricator element has a disc-shaped configuration and defines a third aperture in at least partial registry with said first an second apertures.

6. The apparatus according to claim 5 wherein said lubricator element is integrally formed of an acetal thermoplastic material.

7. The apparatus according to claim 3 additionally comprising a stabilizer element attached to said second support member and engageable with said first support member to limit tilting of said second support member and said equipment due to unbalance of said equipment when said threaded fastener means is loosened.

8. The apparatus according to claim 7 wherein said stabilizer element has a generally arc-like configuration and is secured to a portion of the outer peripheral wall of said second support member.

9. The apparatus according to claim 8 wherein said stabilizer element is formed of an acetal thermoplastic material.

10. The apparatus according to claim 1 additionally comprising a coil compression spring disposed about said threaded fastener means and exerting compressive force against said first support member and tensile force on said equipment base.

11. The apparatus according to claim 1 wherein said first support member includes spaced socket elements for receiving support legs.

12. The apparatus according to claim 1 wherein said second support member defines at least one vent hole spaced from said aperture.

* * * * *